United States Patent [19]

Horak et al.

[11] 4,376,680

[45] Mar. 15, 1983

[54] PROCESS FOR DEMONOMERIZING POLYCAPRONAMIDE

[75] Inventors: Edgardo Horak, Saronno; Alvaro Casati, Paderno Dugnano; Giancarlo Bianucci, Milan; Luigi Marafioti, Milan; Silvio Notarbartolo, Milan, all of Italy

[73] Assignee: Snia Viscosa Societa' Nazionale Industria Applicazioni Viscosa S.p.A., Italy

[21] Appl. No.: 100,907

[22] Filed: Dec. 10, 1979

[30] Foreign Application Priority Data

Dec. 6, 1978 [IT] Italy .............................. 30610 A/78

[51] Int. Cl.³ .......................... B01D 1/22; B01D 3/12
[52] U.S. Cl. ..................................... 203/89; 528/310; 528/332
[58] Field of Search ............. 159/5, 6 R, 6 W, 6 WH, 159/49; 202/185 R, 191, 192, 236; 203/89; 528/332, 310

[56] References Cited

U.S. PATENT DOCUMENTS 2,961,398 11/1960 Waddill ............................... 202/185
3,644,179 2/1972 Knoer et al. ........................... 203/89

Primary Examiner—Frank Sever
Attorney, Agent, or Firm—Wenderoth, Lind and Ponack

[57] ABSTRACT

The process and an apparatus for separating and recovering caprolactam monomer from polycapronamide are described. A process comprises subjecting a molten capronamide to the action of a vacuum while it flows as a thin layer, extracting therefrom caprolactam as a vapor and condensing the caprolactam vapor by contact with a stream of molten caprolactam, substantially under the same vacuum to which the polymer has been subjected. Preferably the caprolactam vapor and the molten caprolactam flow equicurrently, the molten caprolactam being suitably subdivided. Heat exchange intensifying surfaces are present in the equicurrent flow path. The molten caprolactam is circulated in a closed circuit. The apparatus comprises thin layer evaporator, feed means, a condenser, means for creating a vacuum in the evaporator, and means in the condenser for determining the desired path and subdivision of molten and vapor caprolactam streams, a molten caprolactam circulation circuit and means for drawing off caprolactam from said circuit.

10 Claims, 2 Drawing Figures

PROCESS FOR DEMONOMERIZING POLYCAPRONAMIDE

BACKGROUND OF THE INVENTION (a) The Field of the Invention

The present invention relates to a process and an apparatus for demonomerizing polycapronamide polymer. Polycapronamide, known also as nylon 6, is normally prepared by polymerizing caprolactam.

As is known, polycapronamide is in equilibrium with caprolactam monomer in the molten phase in which the polymer is obtained after polymerization or in which it is conveyed to the extrusion spinnerets, so that at normal spinning temperatures said phase contains approximately 10% by weight of caprolactam monomer if a stable equilibrium state is allowed to be reached. When reference is made to "monomer" or to "caprolactam" in the present invention, it should be understood that oligomeric, partly even volatile, fractions may be present therein. The oligomers will therefore always be included in the denomination "monomer" or "caprolactam".

(b) The Prior Art

The separation of the monomer from the polymer has constituted for a long time and from the very beginning of the nylon 6 industry, a technical problem of significant importance. On the one hand, of course, it is desirable for economical reasons to recover said considerable amount of caprolactam and to reuse it in polymerization. On the other hand, it is necessary to eliminate the monomer or at least to reduce it to sufficiently low percentages, in the order of 2% as a maximum, to assure that the polycapronamide products, in particular the yarns, have the desired physical and mechanical characteristics. The commonly used method for demonomerizing polycapronamide consists of washing the polymer in the condition of chips and before the chips are melted to be conveyed to the spinning apparatus.

Said method has drawbacks since the chips have then to be dried, and more importantly, the caprolactam must be finally recovered from the rather diluted solutions which are obtained from washing the chips; and further, it is wholly inapplicable whenever the polymer is directly conveyed from the polymerization apparatus to the spinning, and is not previously solidified and transformed into chips, as is the usual practice when spun fiber is manufactured.

It is generally known, in this case, to extract the caprolactam monomer from the polymer by evaporation and then to recover it by dissolving or condensing it. However no process and apparatus have been described which would permit to effect such a recovery in an industrially efficient way and as a part of an industrial spinning process. The purpose of the present invention is to provide such a process and apparatus.

SUMMARY OF THE INVENTION

According to the invention, the polymer is demonomerized by subjecting it to the action of a vacuum in the molten state and while it is arranged in a thin layer, and the caprolactam vapor thus extracted is condensed by contact with a stream of molten caprolactam, substantially under the same vacuum to which the polymer has been subjected.

According to a preferred form of the invention, the condensation of the caprolactam vapor is effected while it flows equicurrently (concurrently) with the molten caprolactam.

According to a more preferred form of the invention, the molten caprolactam is brought to a suitably subdivided condition to increase the contact surface with the caprolactam vapor.

According to a still more preferred form of the invention, the condensation of the caprolactam vapor is facilitated by providing surfaces which intensify the heat exchange, arranged in the equicurrent flow path of the molten caprolactam and the caprolactam vapor.

Preferably, further, a mass of molten caprolactam is circulated in a closed circuit, in a part of which, it comes into contact with caprolactam vapor; this latter, after condensation, increases the mass of molten caprolactam; and an amount of molten caprolactam corresponding to the condensed amount is continuously drawn from the circulating mass, constantly to maintain this latter in the predetermined quantity. The caprolactam thus drawn off may be directly conveyed to the polymerization or may be purified. Preferably it is conveyed to the polymerization and a further quantity thereof is drawn from the circulating mass and purified, while a corresponding amount of pure caprolactam is added to the circulating mass to maintain its composition within predetermined equilibrium values. The vacuum applied to the caprolactam condensation zone is such that the residual pressure under which the evaporation occurs is from 1 to 20 Torr, preferably from 1 to 3 Torr.

The temperature of the thin layer of molten polymer in the zone in which the vacuum is applied thereto is from 230° to 300° C., preferably from 240° to 260° C., and is normally reached with wall temperatures from 235° to 250° C. The thickness of the thin layer preferably varies from 1 to 3 mm. The pressure in the condensation zone is generally not constant. In the preferred case when caprolactam liquid and vapor flow in equicurrent, the minimum pressure is obtained in the end portion of said zone wherein the vacuum is applied. The temperature in the condensation zone is from 70° and 80° C. and preferably 72° C.

The apparatus according to the invention comprises a thin layer evaporator to evaporate the caprolactam monomer from the polycapronamide polymer, means for conveying the polymer to be demonomerized to said evaporator, means for creating a vacuum in the evaporator through the condenser and to convey to the condenser the evaporated caprolactam vapor, the condenser being provided with means for defining the desired path and the desired subdivision of the streams of molten caprolactam and caprolactam vapor, a circuit for the circulation of molten caprolactam which feeds the condenser and is fed thereby (or in which the condenser is inserted in series), and means for drawing from said circuit a stream of caprolactam corresponding to the condensed amount.

The thin layer evaporator may be of a type known per se. Preferably it is constituted by a vertical cylindrical vessel provided with means for smearing the molten polymer onto the walls and facilitating its downwardly progress by gravity or by thrust.

The condenser too may conveniently—but not necessarily—be an essentially cylindrical, vertical vessel provided with means for effecting an initial subdivision of the molten caprolactam fed thereto, for instance by spraying it or transforming it into droplets or liquid veins, and preferably provided with means for increasing the contact surface between molten caprolactam and caprolactam vapor and facilitating the heat exchange between these phases. Said means may be plates on which the liquid flows in a thin layer, or Raschig rings, or other means known in the art for this purpose.

The vacuum for extracting the caprolactam vapor from the polymer is applied at a convenient point of the condenser, and this latter is connected to the evaporator by means of a conduit which permits the transmission of the vacuum and the flow of the caprolactam vapor from the evaporator to the condenser. The point at which the vacuum is applied is such as to cause the desired flow, preferably equicurrently, of the molten caprolactam and the caprolactam vapor. Both the condenser and the evaporator are provided with heating and thermostatizing means, adapted to produce, in relation to the degree of vacuum which is applied to both, the evaporation of the caprolactam in the evaporator and its condensation in the condenser.

Preferably the conduit which connects the evaporator to the condenser has a cross-section which decreases from the first to the second, to cause an increase of the speed of the caprolactam vapor going towards the condenser, preferably to a ratio between 1:2 and 1:3, and still more preferably to such a ratio that the linear speed of the caprolactam vapor entering the condenser be comprised between 50 and 90 mt/sec.

DETAILED DESCRIPTION OF PREFERRED EMBODIMENTS

Figure 1:
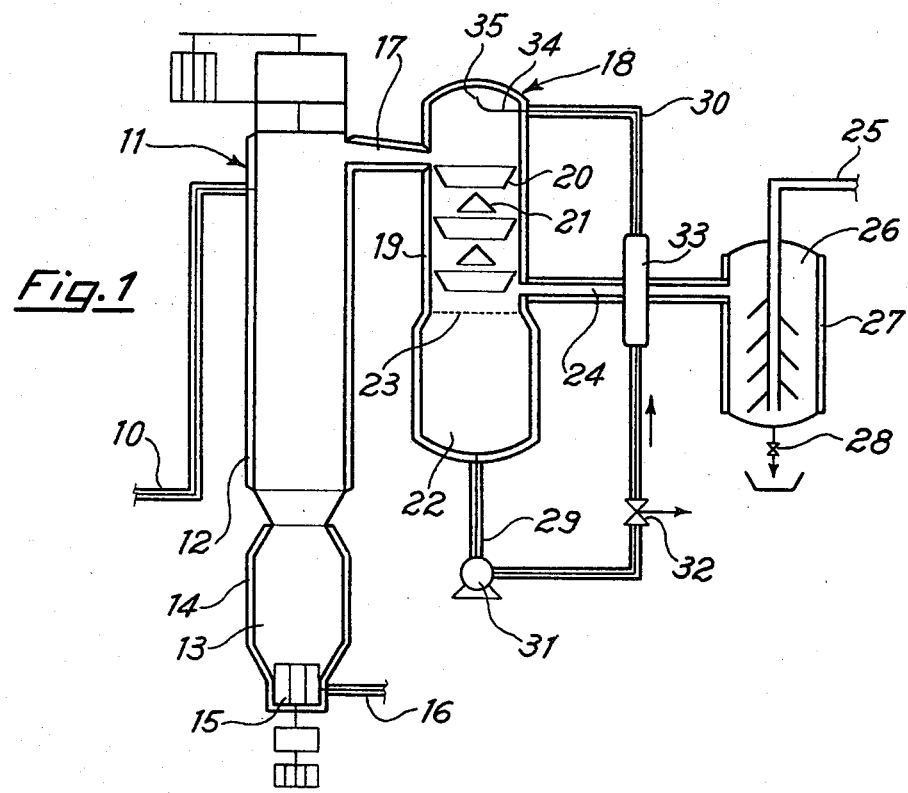

The invention will be better understood from an embodiment of the same, with reference to the attached drawings wherein:

FIG. 1 represents a general diagram of the demonomerization apparatus; and

Figure 2:
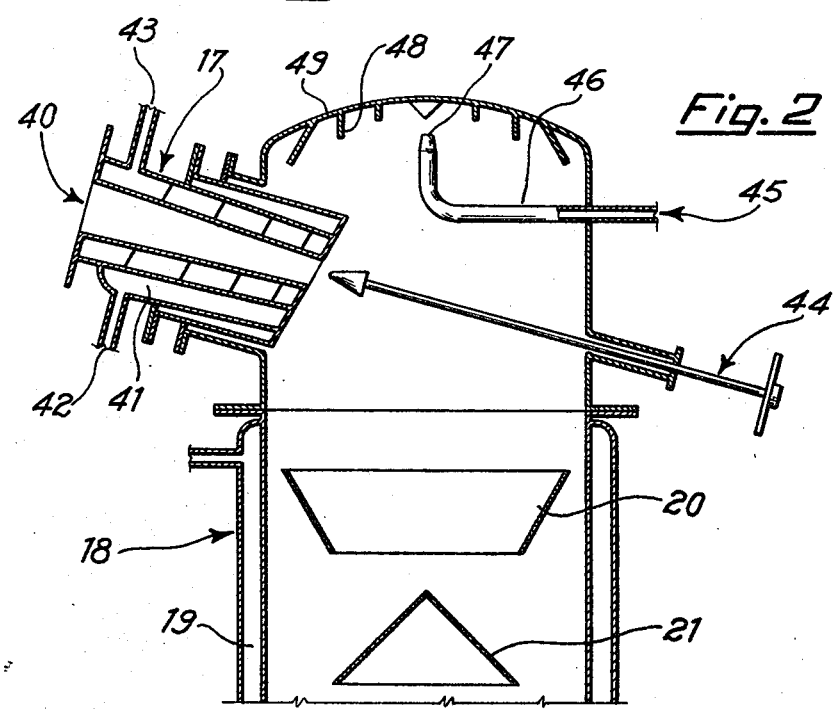

FIG. 2 schematically illustrates in cross-section the upper part of the condenser with the conduits for feeding caprolactam vapor to the evaporator and molten caprolactam from the circulation circuit thereof.

With reference to FIG. 1, numeral 10 indicates a suitably heated, molten polycapronamide feed pipeline, which conveys the polycapronamide to the evaporator generally indicated at 11. The molten polycapronamide may arrive directly from a polymerization tube or from a melting apparatus, such as an extruder, to which solid caprolactam to be polymerized may be fed, said solid caprolactam being melted therein and fed to pipeline 10.

Evaporator 11, provided with a heating double jacket 12, is preferably constituted, as has been said, by a vertical tube within which a number of blades, rotating about a vertical axis, maintain the polycapronamide smeared in a thin layer on the walls and, thanks to their shape, also aid its downwardly progress by gravity. The specific structure of the evaporator is not illustrated both because it is not critical, since other thin layer evaporators may be used, and because it is well known to persons skilled in the art.

The demonomerized polycapronamide passes through a barrel 13, also provided with heating jacket 14, wherein a head thereof is formed and from which it is fed to a drawing pump 15 and therefrom through a pipeline 16 to the extrusion, not illustrated because it is not a part of the invention.

Evaporator 12 is provided at its upper end with a conduit 17, also heated by the double jacket 12 or by other suitable heating means, which, as schematically indicated, has a cross-section which decreases proceeding away from the evaporator, so that the speed of flow of the caprolactam vapor increases as it flows away from the evaporator. Preferably the cross-section decreases in a ratio from 1:2 to 1:3, and the dimensions of conduit 17 are such that the linear speed of the caprolactam vapor in its minimum cross-section is from 50 to 90 mt/sec. At its end, where the conduit 17 has the smallest cross-section, said conduit opens into the condenser, generally indicated at 18 and provided with a double jacket 19 which maintains it at a temperature suitable for the condensation of the caprolactam. Within the condenser 18, plates or Raschig rings or other means for guiding the path of fluids and increasing the contact surface and facilitating the heat exchange, are arranged; in this example such means are generally indicated as plates 20 and 21.

In the lowermost portion 22 of the condenser 18, which is indicated in the drawing as having a slightly larger diameter, a head of molten caprolactam up to level 23 is formed, which head constitutes a hydraulic seal at the bottom of the condenser. At level 23 a grid may be placed, as schematically indicated, for retaining rough impurities and filling material which may exit from the condenser. A vacuum pipeline 24 opens into the condenser immediately above level 23 and connects the condenser in the vacuum source 25 through a vessel 26 which acts as a vapor trap and is suitably cooled with brine. The small amounts of caprolactam recovered in said vessel may be discharged from the bottom through a pipeline schematically indicated at 28.

The molten caprolactam circulation circuit comprises first of all a pipeline 30 provided with a jacket wherein a cooling means, e.g. hot water, circulates and in which a suitable circulation pump is inserted, e.g. at 31. The caprolactam circulation takes place in the direction indicated by the arrow. The molten caprolactam is drawn off from the mass which is situated in the part 22 of the condenser through the pipeline 29, it passes through the circulation pump 31, it flows at a convenient point through a caprolactam draw-off valve 32, through a heat exchange 33 for stabilizing the temperature of the circulating monomer at the predetermined values, and finally reaches the upper part of the condenser 18 through a terminal portion 34 provided with a nozzle 35 and which will be better described with reference to FIG. 2.

The caprolactam drawn off from valve 32 is conveyed through the pipeline 36, by means not illustrated, either to the polymerization or to the purification or anyway any desired use is made thereof. The quantity of molten caprolactum which is conveyed per unit time to the condenser is kept constant. This can be obtained by drawing off through valve 32 in any period of time an amount of caprolactam equal to the amount condensed in said period. In some cases an accumulation of impurities might occur and it might then be desirable to draw off an additional amount of caprolactam, from valve 32 or optionally from another point of the circuit, and to feed a corresponding amount to any point of the circuit, not illustrated, thereby maintaining the impurities of the circulating caprolactam mass at a tolerable equilibrium level through the continuous substitution of circulating caprolactam with fresh purified caprolactam. This amount, per unit time, is preferably between 10 and 50% of the total circulating flow rate. Such a provision however is not essential and it may be omitted in the greater part of the practical cases.

FIG. 2 schematically illustrates the upper portion of a condenser 18, of a type per se known, adapted for carrying out the invention. The heating jacket 19 and two plates 20 and 21, are illustrated, as well as the terminal portion of the pipeline 17 through which the monomer vapor (together with a certain amount of volatile oligomers) enter the condenser. The inlet of this terminal portion of pipeline 17 is indicated at 40. It is noted that the inner cross-section of the pipeline decreases as one goes towards the condenser. In the case illustrated the ratio of the maximum cross-section of pipeline 17 to that of the inlet orifice into the condenser is in the order of magnitude of 2.

The pipeline is provided with a heating jacket 41 with heating fluid inlet at 42 and outlet at 43. Preferably a tube cleaner rod generally indicated at 44 is arranged facing the outlet of pipeline 17 into the condenser, to eliminate possible obstructions of said outlet due to possible local condensation of volatile products.

The molten caprolactam reaches pipeline 30 of FIG. 1 and enters at 45 into a pipe 46 which extends internally of the condenser all the way to its axis where it has a nozzle schematically indicated at 47. From said nozzle it is projected towards the vault 49 of the condenser on which elements 48 having a suitable shape and orientation are disposed, which elements cause the liquid caprolactam to fall back as a drizzle.

Condenser structures different from that described could naturally be employed to carry out the invention, and the various details relating to carrying the invention into practice and the specific operative conditions could be modified by a person skilled in the art without exceeding the scope of the invention.

We claim:

1. Method for the demonomerization of polycapronamide containing caprolactam monomer, which comprises:
    (a) providing a thin layer evaporator for evaporating the caprolactam monomer from the polymer,
    means for conveying to said evaporator the polycapronamide to be demonomerized,
    a condenser,
    means for creating a vacuum in the evaporator through the condenser and for conveying to the condenser the evaporated caprolactam vapor,
    the condenser being provided with means for contacting said caprolactam vapor with molten caprolactam whereby said molten caprolactam can absorb said vapor caprolactam and means for determining the desired path and the desired subdivision of the molten and vapor caprolactam,
    an external molten caprolactam circulation circuit which feeds the condenser and is fed thereby,
    means for drawing off from said circuit a stream of caprolactam corresponding to the amount of vapors which are absorbed,
    and means on said circuit for replacing a portion of said stream containing said absorbed vapors with fresh, pure caprolactam,
    (b) introducing into said thin layer evaporator said polycapronamide containing caprolactam monomer, and
    (c) removing demonomerized caprolactam from said means for drawing off caprolactam.

2. Method according to claim 1, wherein the evaporator comprises a vertical cylindrical vessel provided with means for smearing the molten polymer onto the walls and for facilitating its downwardly progress by gravity.

3. Method according to claim 1, wherein the condenser is a vertical vessel provided with means for effecting an initial subdivision of the molten caprolactam fed thereto.

4. Method according to claim 1, wherein the condenser is provided with means for increasing the contact surface between molten caprolactam and caprolactam vapor and for facilitating the heat exchange between said two phases.

5. Method according to claim 1, wherein the condenser is connected to a source of vacuum and is connected to the evaporator by means of a conduit which permits the transmission of the vacuum and the flow of the caprolactam vapor from the evaporator to the condenser.

6. Apparatus according to claim 5, wherein the conduit which connects the evaporator to the condenser has a cross-section which decreases in diameter from the entrance to the outlet of said conduit.

7. Method according to claim 6, wherein the cross-section of said conduit decreases from the evaporator to the condenser in a ratio between 1:2 and 1:3.

8. Method according to claim 6, wherein the outlet cross-section of said conduit is such as to produce inlet linear speeds of the caprolactam vapor into the condenser comprised between 50 and 90 m./sec.

9. Method according to claim 1, wherein the evaporator and the condenser are provided with heating and thermostat means.

10. Method according to any one of claims 1 to 4 wherein said molten caprolactam circuit comprises means for withdrawing molten caprolactam from the base of said condenser and means for recirculating said molten caprolactam to the top of said condenser, said caprolactam vapors from said evaporator being introduced into said condenser in proximity to the top of said condenser and said molten and vaporous caprolactam concurrently flowing to the base of said condenser.

* * * * *